US009218709B2

(12) United States Patent
Young

(10) Patent No.: US 9,218,709 B2
(45) Date of Patent: Dec. 22, 2015

(54) ELECTRONIC GAMING SYSTEM AND METHOD WITH DYNAMIC WHEEL

(71) Applicant: Spin Games LLC, Reno, NV (US)

(72) Inventor: Kent Young, Reno, NV (US)

( * ) Notice: Subject to any disclaimer, the term of this patent is extended or adjusted under 35 U.S.C. 154(b) by 130 days.

(21) Appl. No.: 13/965,532

(22) Filed: Aug. 13, 2013

(65) Prior Publication Data

US 2014/0194182 A1 Jul. 10, 2014

Related U.S. Application Data

(60) Provisional application No. 61/706,978, filed on Sep. 28, 2012.

(51) Int. Cl.
*A63F 13/00* (2014.01)
*G07F 17/32* (2006.01)

(52) U.S. Cl.
CPC ........ *G07F 17/3213* (2013.01); *G07F 17/3211* (2013.01)

(58) Field of Classification Search
None
See application file for complete search history.

(56) References Cited

U.S. PATENT DOCUMENTS

| | | | | |
|---|---|---|---|---|
| 5,848,392 | A | 12/1998 | Shudo | |
| 2010/0048284 | A1* | 2/2010 | Jaffe | 463/20 |
| 2011/0294563 | A1* | 12/2011 | Jaffe | 463/20 |
| 2012/0088576 | A1* | 4/2012 | Shepherd et al. | 463/26 |
| 2012/0122545 | A1* | 5/2012 | Watkins et al. | 463/20 |
| 2012/0329550 | A1* | 12/2012 | Acres | 463/25 |

* cited by examiner

*Primary Examiner* — Jason Yen
(74) *Attorney, Agent, or Firm* — Marc D. Foodman

(57) ABSTRACT

A gaming system and method for use in one or more casino establishments for offering a secondary game initiated after a loss. The gaming machine and method are offered on electronic gaming machines such as slot machines and video poker machines, but may also be deployed in other forms such as on a general purpose computing device in stand-alone form or connected to a network such as the internet.

18 Claims, 11 Drawing Sheets

ELECTRONIC GAMING SYSTEM AND METHOD WITH DYNAMIC WHEEL

RELATED APPLICATION INFORMATION

This application claims priority benefit from U.S. Provisional Application No. 61/706,978, filed on Jun. 13, 2012, the entirety of which is incorporated herein by reference.

COPYRIGHT NOTICE

Portions of this disclosure contain material in which copyright is claimed by the applicant. The applicant has no objection to the copying of this material in the course of making copies of the application file or any patents that may issue on the application, but all other rights whatsoever in the copyrighted material are reserved.

BACKGROUND

Electronic gaming machines ("EGMs") offer a variety of games such as slot games, video poker games, roulette games, keno games and other types of wagering games that are commonly deployed at a casino for use by players. Play on the EGMs typically requires the player to place a wager on the outcome of a primary game. On many such EGMs, secondary games or bonus rounds are also available after the player qualifies by attaining a certain winning combination or event on or related to the primary game. The player would then enter the secondary game or bonus round where they have an opportunity to win extra game credits, game tokens or other awards. The player automatically enters the secondary game or bonus round upon achieving a winning game outcome, or alternatively, when a bonus symbol appears in a predetermined position on the reels of a slot game (or the game display of another type of game) upon completion of the game. The player may be awarded credits for winning the base game and then additional credits for winning the secondary game.

Historically, the format of game play with winning combinations entitling the player to enter a secondary or bonus round have worked well for players and gaming establishments. They generate player excitement and maintain the interest of the player. However, for a player who hits a streak of losses, it may result in the player leaving the game, and possibly the gaming establishment without further play.

The present invention is a gaming system and method for offering a "secondary game" or "bonus game" to a player on a wheel. Like other games played on an EGM, the player places an initial wager to play. A random number generator on the EGM generates an outcome and that outcome is displayed on the EGM display to the player. In the event the outcome is a winning combination, the player is awarded a prize in accordance with the EGM pay table, and a chance to play the bonus game for an additional opportunity to win a prize. Eligibility for play of the bonus game opportunity may be provided as a function of standard game play, or it may require an optional buy-in wager placed by the player. The optional buy-in may be presented at the beginning of the base game, or at the end of the base game, but before the bonus game begins. It is also possible to offer the bonus game function either through the stand-alone EGM game program or through either a separate bonusing device or server dedicated to the bonus game that is connected to a single EGM or group of EGMs. Alternatively, a general server-based gaming system networked to the EGM may provide the bonus game, and it may be offered either to a single player or to multiple players where the wagers from the connected EGMs are pooled together to provide available funding for prizes. A networked game provides greater flexibility in designing the game for payout volatility and prize size.

BRIEF DESCRIPTION OF THE DRAWINGS

For a better understanding of the present invention, and to show more clearly how it functions, reference will now be made, by way of example, to the accompanying drawings. The drawings show embodiments of the present invention in which.

DETAILED DESCRIPTION OF THE INVENTION

Figure 1A:
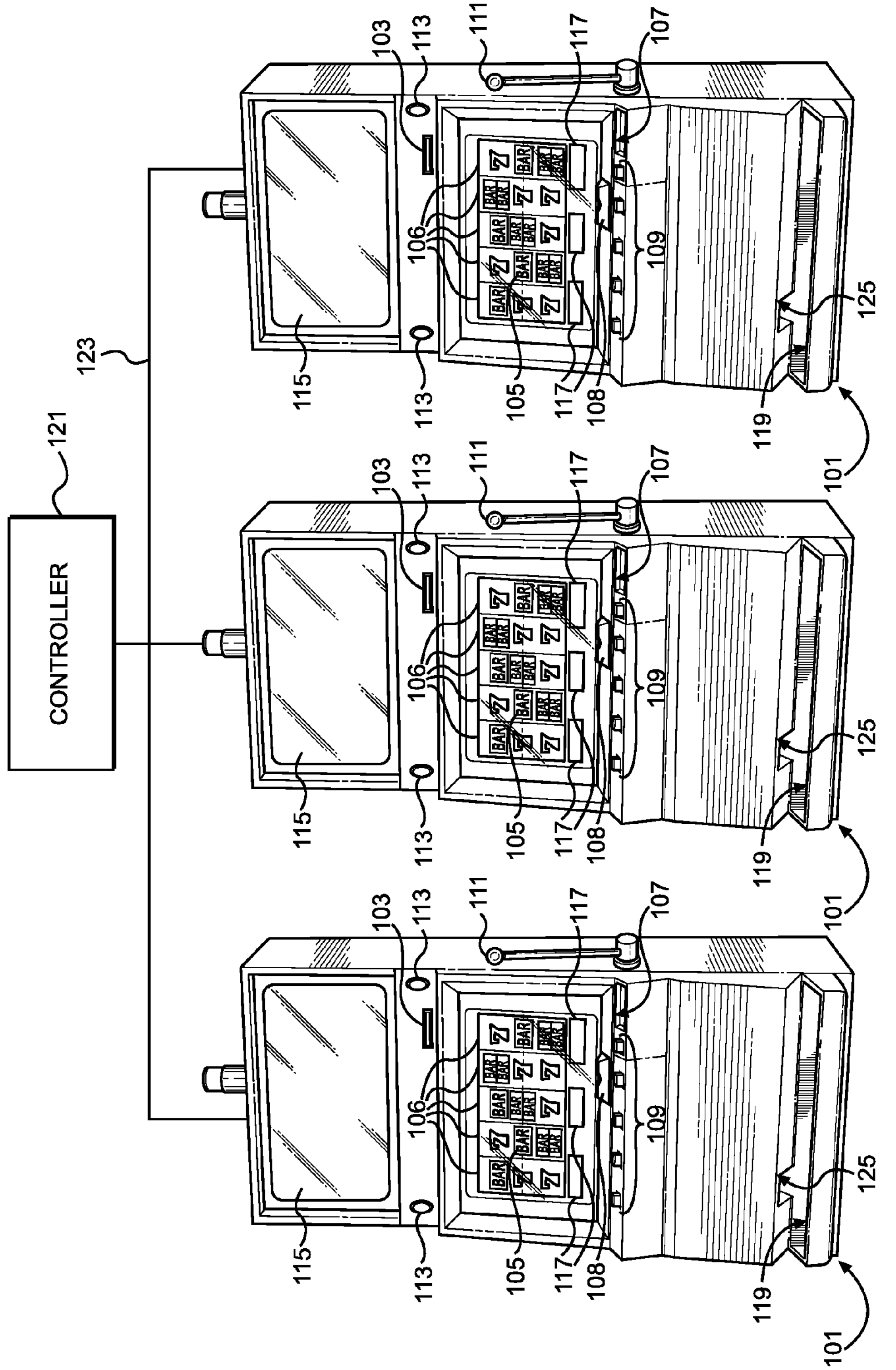
FIG. 1A PRIOR ART
FIG. 1A shows an electronic gaming machine having a bonus game played on a bonus wheel.
Figure 1B:
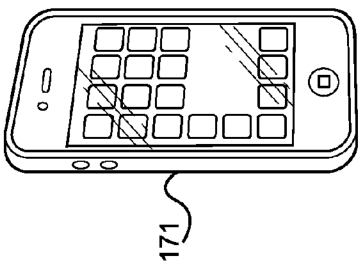
FIG. 1B PRIOR ART
FIGS. 1B-1F shows electronic gaming machines for playing a game connected to a network controlled by a server.

The present invention will now be described more fully with reference to the accompanying drawings. It should be understood that the invention may be embodied in many different forms and should not be construed as limited to the embodiments set forth herein. Throughout FIGS. 1-8, like elements of the invention are referred to by the same reference numerals for consistency purposes.

FIG. 1A shows a group of EGMs connected to a central controller. Each EGM 101 is a wagering device that is used in a casino and may be configured to display and play any of a number of different types of games, including but not limited to electromechanical spinning reel type slot games, video reel games, video poker, keno, roulette, craps, blackjack, or any other type of wagering game.

A group of EGMs 101 forms a bank that may be connected together for different types of system applications. For example, a group of EGMs 101 may be linked together for bonusing in a variety of ways, including progressive bonuses where a portion of an amount wagered is applied to a progressive meter that advances as additional games are played. It is also common for EGMs in a casino establishment to be connected to systems for player tracking so that the casino can keep track of the amount of play by each individual player. In that case, each player is issued a player tracking device such as a card that is inserted into a card slot 103 on EGM 101 during play. The card identifies the player to the system and all wagered amounts are tracked for loyalty rewards and other marketing programs of the casino. Other systems connecting EGMs 101 are used for accounting purposes so that a casino operator can monitor and track play, and assess performance of EGMs across the entire casino floor.

Each EGM 101 has a number of components. A display 105 is used to show game play and resulting outcomes, and may be in the form of a video display (shown), or alternatively, physical reels. Touch screen displays are included on most EGMs and provide a flexible interface for operation of EGM 101, including displaying symbols 106 during play. Other components include a bill validator and a coin acceptor that are both housed inside EGM 101 into which bills may be inserted through bill slot 107 and coins may be inserted through coin head 108, respectively. Buttons 109 on the exterior of EGM 101 are used to control certain EGM operations in conjunction with touch screen display 105. A handle 111 (see FIGS. 1A and 3A) may be used to initiate play of a game and speakers 113 (see FIGS. 1A and 3A) are used to provide sounds in conjunction with game play and other EGM operations. EGMs further include a top box 115 for displaying pay tables, artwork, advertising or other types of information either on fixed glass or on other displays such as an integrated video panel. Top box 115 may be fitted with a liquid crystal display ("LCD") screen to permit aspects of game play from either a base game or a secondary game to be shown in top box 115. Meters 117 for tracking credits available for play and other amounts are positioned near the bottom or screen 105. A coin tray 119 at the bottom of EGM 101 is used to catch coins as they are dispensed to a player. It is also common for EGM 101 to include a ticket-in, ticket-out ("TITO") component that is part of the bill validator housed inside of EGM 101 that may accept bar coded credits through slot 107 and for which the value of the credits is displayed on meters 117 upon a ticket being inserted.

All operational functions of EGM 101 are controlled by a controller such as a microprocessor (not shown) housed in side EGM 101. The controller executes instructions that include operation of a random number generator ("RNG") that is well known to those of ordinary skill in the art. Game outcomes are determined based on the results corresponding to the numbers selected by the RNG.

Figure 3A:
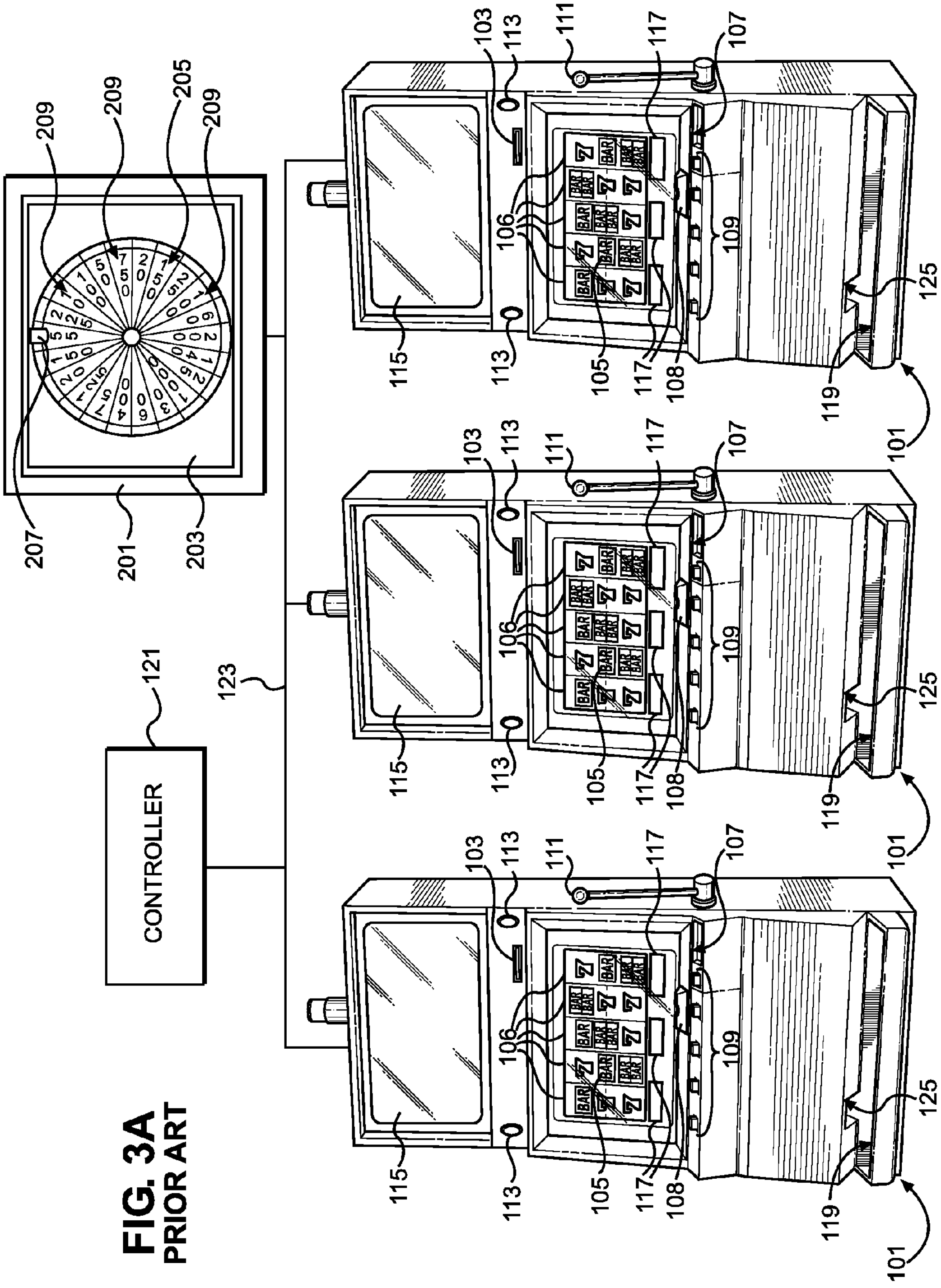
FIG. 3A PRIOR ART
FIG. 3A shows electronic gaming machines for playing a game connected to a network controlled by a server and including a networked bonus game display.

In the system of FIG. 1A, EGMs 101 are connected to a controller 121 that is used to interface with EGMs 101 to perform a number of different functions, depending on how games on EGMs 101 are configured to operate. For example, controller 121 may instruct EGMs 101 to dispense cash bonuses based on winning events on a networked bonus feature such as a bonus wheel 201 as shown in FIG. 3A. Controller 121 is a microprocessor based device such as a computer or server that is in two-way communication with each of the EGMs 101 in a multi-device system over a network connection 123. Controller 121 receives signals from EGM 101 that may indicate any of a number of different types of events occurring on EGM 101.

Figure 1C:
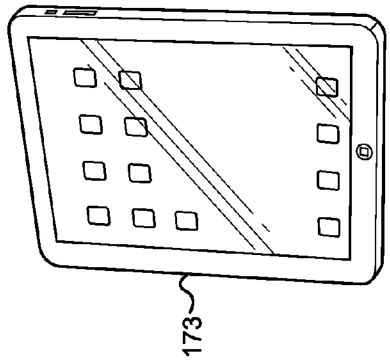
FIG. 1C PRIOR ART
Figure 1D:
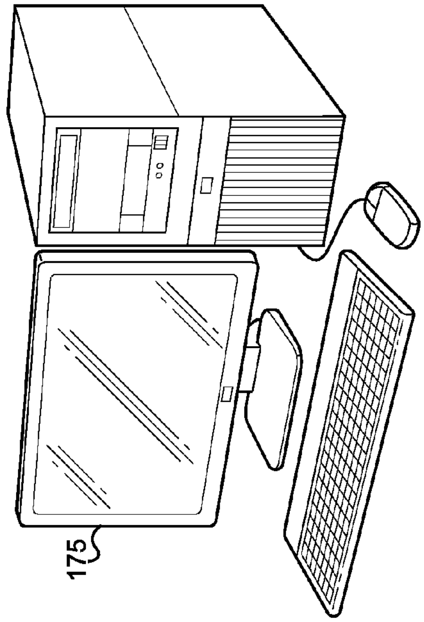
FIG. 1D PRIOR ART
Figure 1E:
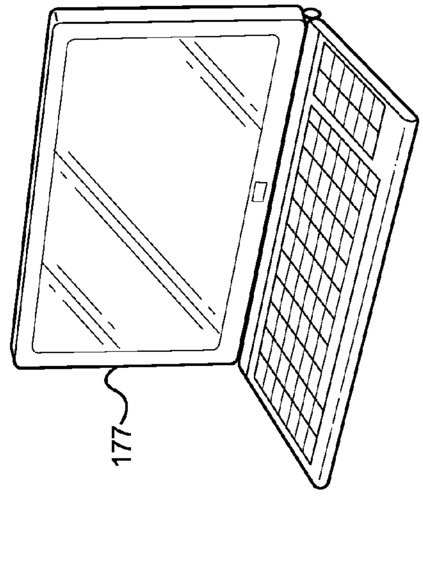
FIG. 1E PRIOR ART
Figure 1F:
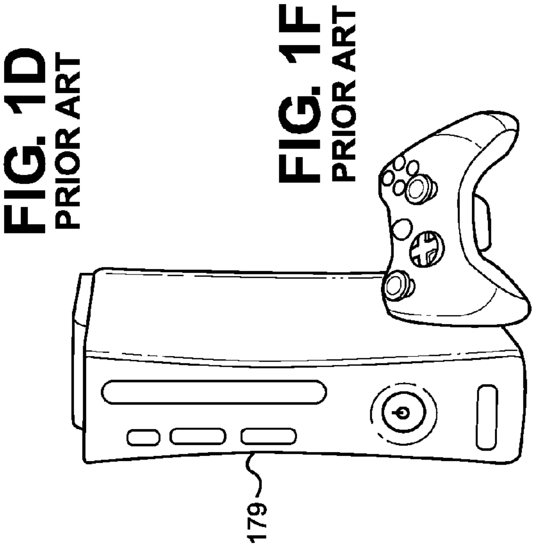
FIG. 1F PRIOR ART

FIGS. 1B-1F show a number of general purpose computing devices which may be used to play a game. These figures show a smartphone 171 in FIG. 1B which may be an Apple iPhone 4S® as pictured, or any other mobile phone type device. A tablet computer 173 is shown in FIG. 1C which may be an Apple iPad 3® as pictured, or any other tablet computing device. A desktop computer 175 is shown in FIG. 1D which may be a Lenovo® machine as pictured, or any other desktop computer. A laptop computer 177 is shown in FIG. 1E which may be a Lenovo® computer or any other laptop computer. And, a home video gaming device 179 is shown in FIG. 1F which may be a Microsoft Xbox® system or any other home video system. Other types of network connected devices could also be used to play games including portable video gaming devices such as a Sony PSP®, a Nintendo GameBoy®, or an internet connected television with a browser or app capabilities. Any of these devices is capable of playing a game, including a wagering game, through an app loaded onto the device or through a website accessible using a browser on the device. In the case of the networked game, payment may be made by credit card, Paypal® or another payment service. The RNG is run securely on a server based system and then delivers the outcomes over the internet to be displayed on the general purpose computing device.

Figure 2:
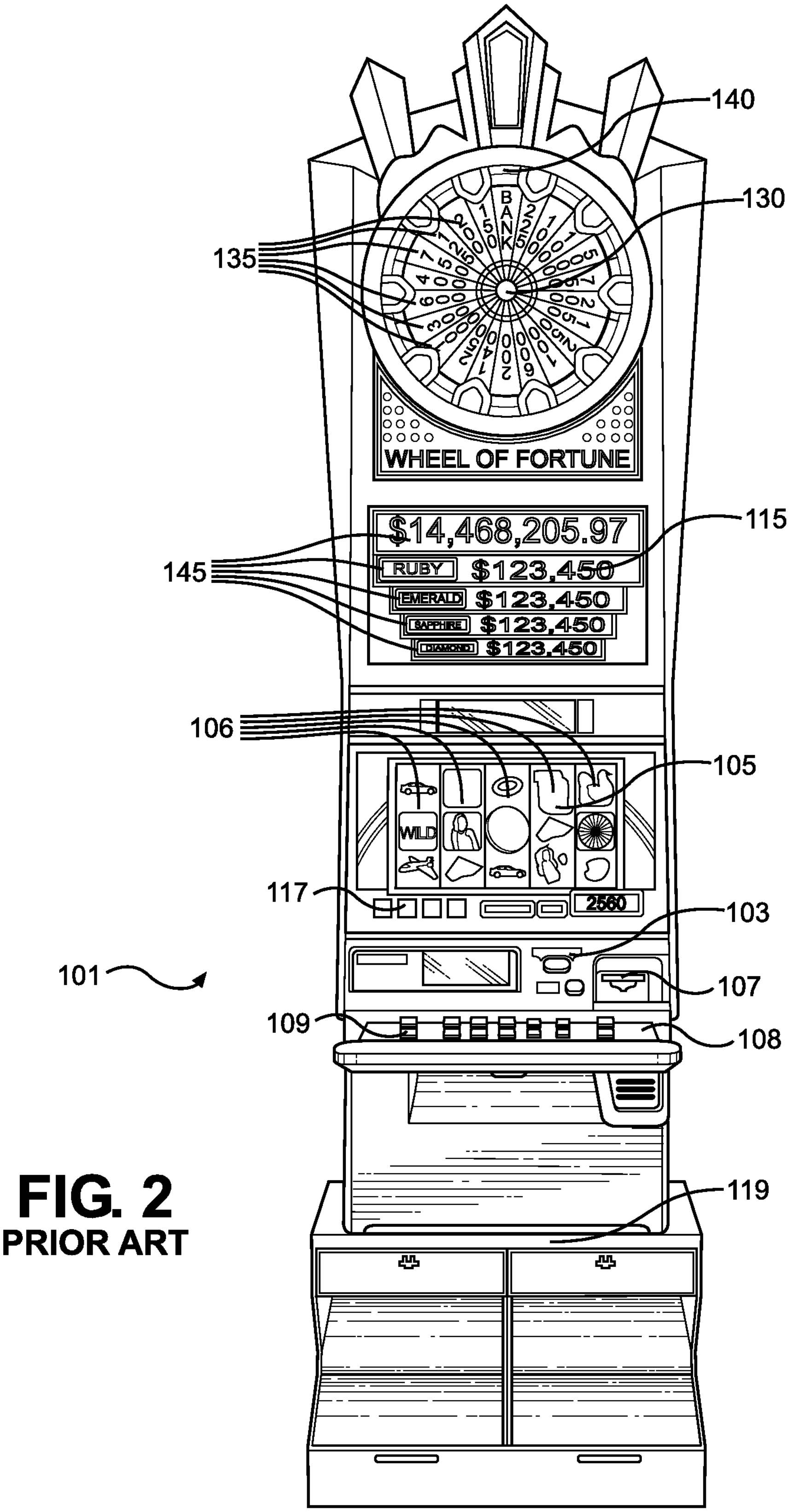
FIG. 2 PRIOR ART
FIG. 2 is a Wheel of Fortune® machine manufactured by IGT.

EGM 101 of FIG. 2 is a Wheel of Fortune® machine manufactured by IGT. Most of the components of this EGM are the same as the EGMs of FIG. 1A. However, this EGM includes a bonus wheel 130 that is a physical rotating wheel with award segments 135 around the wheel incorporated into the EGM cabinet. Upon getting a Wheel of Fortune bonus symbol on the base game, a player is entitled to spin bonus wheel 130 for a chance at a bonus award, the amount of which depends on the resulting segment stopping at indicator 140. A set of different progressive bonus prizes 145 are also available to a player for hitting certain symbol combinations on the base game and those progressive bonuses are shown in top box 115.

FIG. 3A shows a group of EGMs 101 and controller 121 connected on network 123 along with a bonus device 201. Bonus device 201 is in the form of a wheel 203 with different potential winning outcome amounts 205 shown on it. Bonus device 201 also includes an indicator 207 to indicate the winning position when wheel 203 comes to a stop. Prize values 209 or other symbols representing different outcomes are shown in the different positions or segments of wheel 203. It should be understood that bonus device 201 may alternatively be a screen for displaying a bonus indicator such as a wheel or any other indicator representation. Further, bonus device 201 may alternatively be incorporated in the housing of EGM 101 such as in top box 115, or it may be a separate device situated nearby to EGM 101 and shared by more than one EGM 101 so that it may be displayed prominently for visitors to a casino establishment to see thereby raising the excitement level for the player playing and the other casino customers. Bonus device 201 may take the form of any bonus indicator, a variety of which are known, including but not limited to reels, "pick a prize" reveal type bonus indicators, timers, arrows, etc. Bonus device 201 may also be in the form of a dedicated device specifically designed for a particular type of bonus, such as a wheel.

In FIG. 3A, EGM 101 is shown as a casino gaming device of the type depicted in FIGS. 1A and 2. It should be understood that any one or more of the general purpose computing devices of FIGS. 1B-1F—smartphone 171, tablet computer 173, desktop computer 175, laptop computer 177, or home video gaming system 179 shown in FIGS. 1B-1F—could be placed on a network connected to server based system 221 and used to deliver a game as described herein. For purposes of this specification, reference to one or more EGMs 101 in an environment using a limited access intranet of the type typically found in a casino would also apply to one or more general purpose computing devices with a secure connection to a server over the internet and not involving a physical casino property at all, and which may or may not require a wager or payment to play.

Figure 3B:
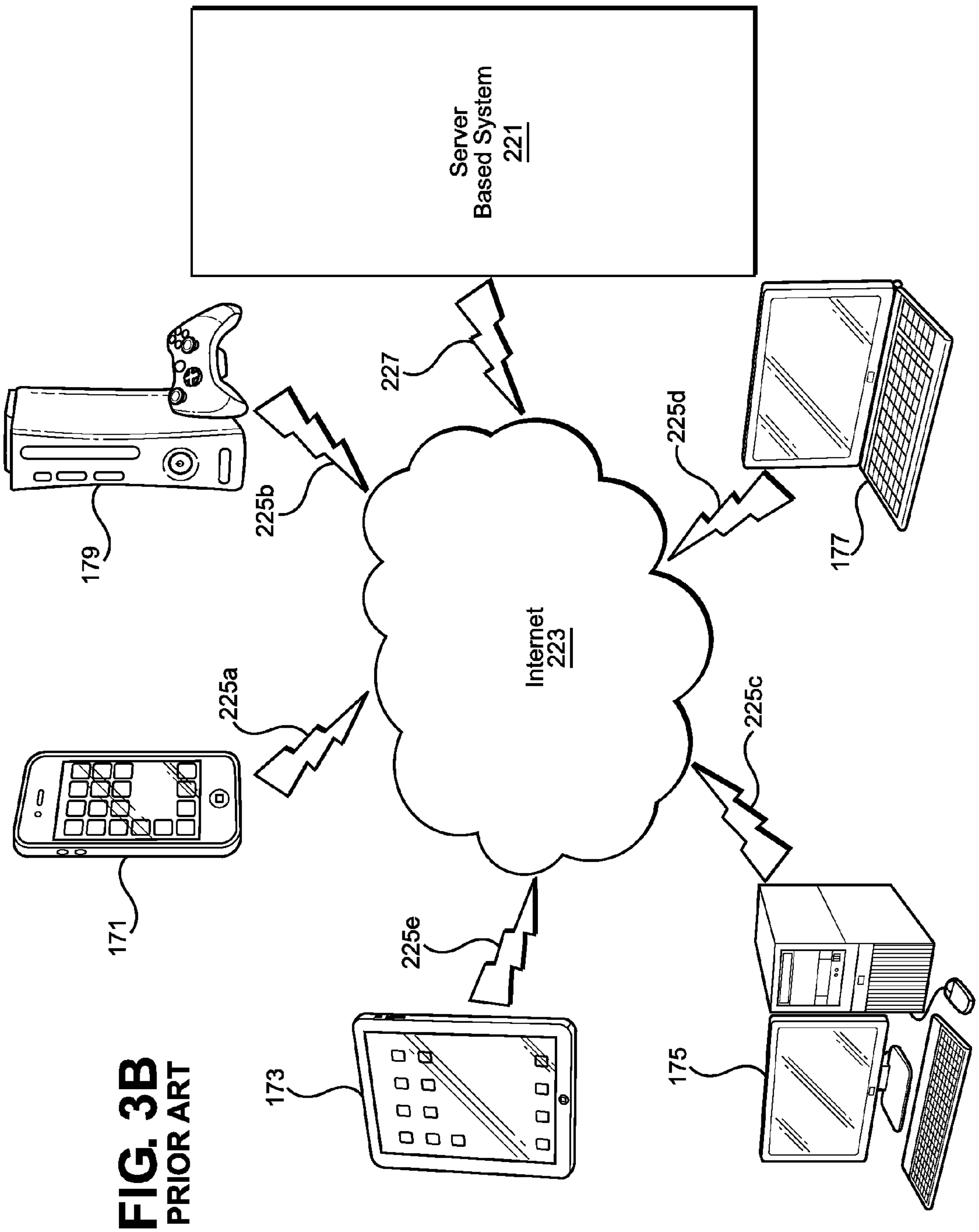
FIG. 3B PRIOR ART
FIG. 3B shows a group of electronic gaming machines on a network connected to a server based system and an external system.

FIG. 3B shows server based system 221 connected to a network with multiple computing devices for playing games. It should be understood that the network shown in FIG. 3B operates in a manner similar to the network of FIG. 3A, except that the computing devices on the network of FIG. 3B are connected over the internet 223 with each device 171-179 connected over a secure connection 225*a*-*e* to server based system 221 which connects to internet 223 over network connection 227. Payments can be made securely over internet 223 using connections 225*a-e*, and then delivered to an operator over connection 227. Similarly, the game is executed on server based system 221 using a secure RNG with the outcomes being delivered to the individual devices 171-179 over internet 223. Alternatively, the game software or a portion of it may be resident and executed on each device 171-179. Wagers by players and payments to players may be made using accounts set up with an operator of a website on which the games are run.

It will be understood that the type of network over which data is communicated can be one of several different types of networks. These networks include a Local Area Network (LAN), Wide Area Network (WAN), an intranet or the Internet. Other proprietary networks could also be used without departing from the principles of the invention. This would include such networks as a Windows network or an Ethernet network.

Figure 4:
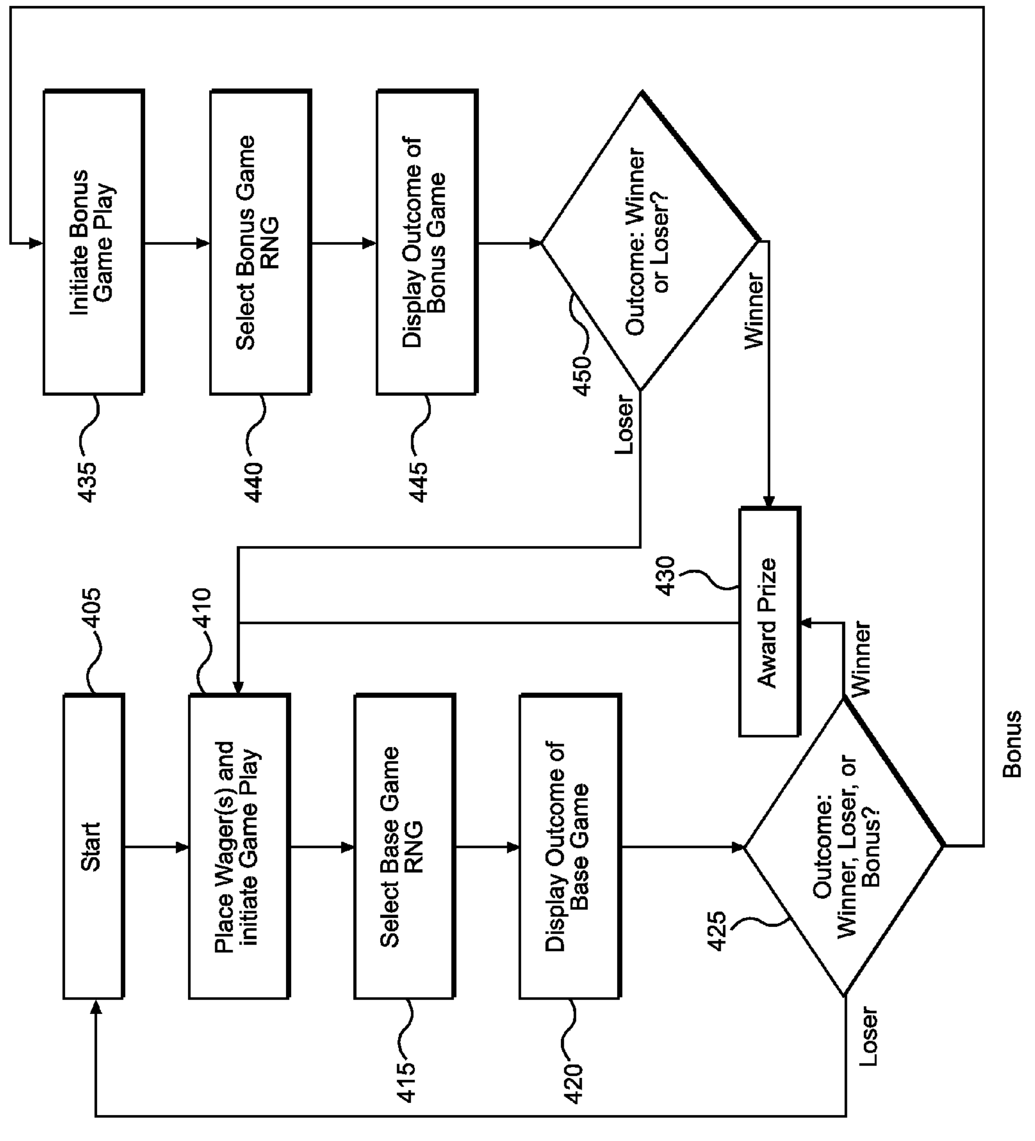
FIG. 4 shows a flow chart of game play on an electronic gaming machine with a base game and a bonus game.

For the EGMs and connected networks shown in FIGS. 1-3, the game play of the invention follows a sequence of steps shown in the flow chart of FIG. 4. The player begins at start 405 and places a wager 410 to initiate play on EGM 101. The wager may be a single wager that allows the player to play a base game and be eligible for a bonus game. Or, the wager may have two components, a first base game wager permitting the player to play the base game and a second, optional wager, for the player to be eligible for participation in the bonus game, depending on the outcome of the base game.

Once the wager or wagers are placed, a base game RNG is selected 415 and the corresponding outcome for the base game is displayed 420. The base game outcome may be either a winner, a loser and/or it may include a symbol or group of symbols that triggers the bonus game, which determination is made at step 425. If it is a winner, the player is awarded the appropriate prize at step 430, usually in the form of credits added to a credit meter that is one of meters 117. Once the award is made, the player is returned to the step of placing a wager 410.

In the event that the outcome of the base game includes a bonus trigger, the player is offered the opportunity to initiate a bonus game. Eligibility for the bonus game may be provided in a number of possible ways. First, it may be part of the overall game play with no additional wager being required. Second, it may be contingent on a separate wager at the "place wager" step 410. Or third, it may be contingent on a separate wager placed at the time of the determination of the outcome of the base game at step 425. Once eligibility is established, the player is given the opportunity to play the bonus game 435. A bonus game RNG is then selected 440, and the corresponding outcome of the secondary is displayed 445. The bonus game outcome may be either a winner or a loser and that determination is made at step 450. If it is a winner, the player is awarded the appropriate prize 430, and returned to begin a new game at the "place wager" step 410. If the outcome of the bonus game is a loser, the player is returned directly to the place wager step 410 without being awarded a prize.

Figure 5A:
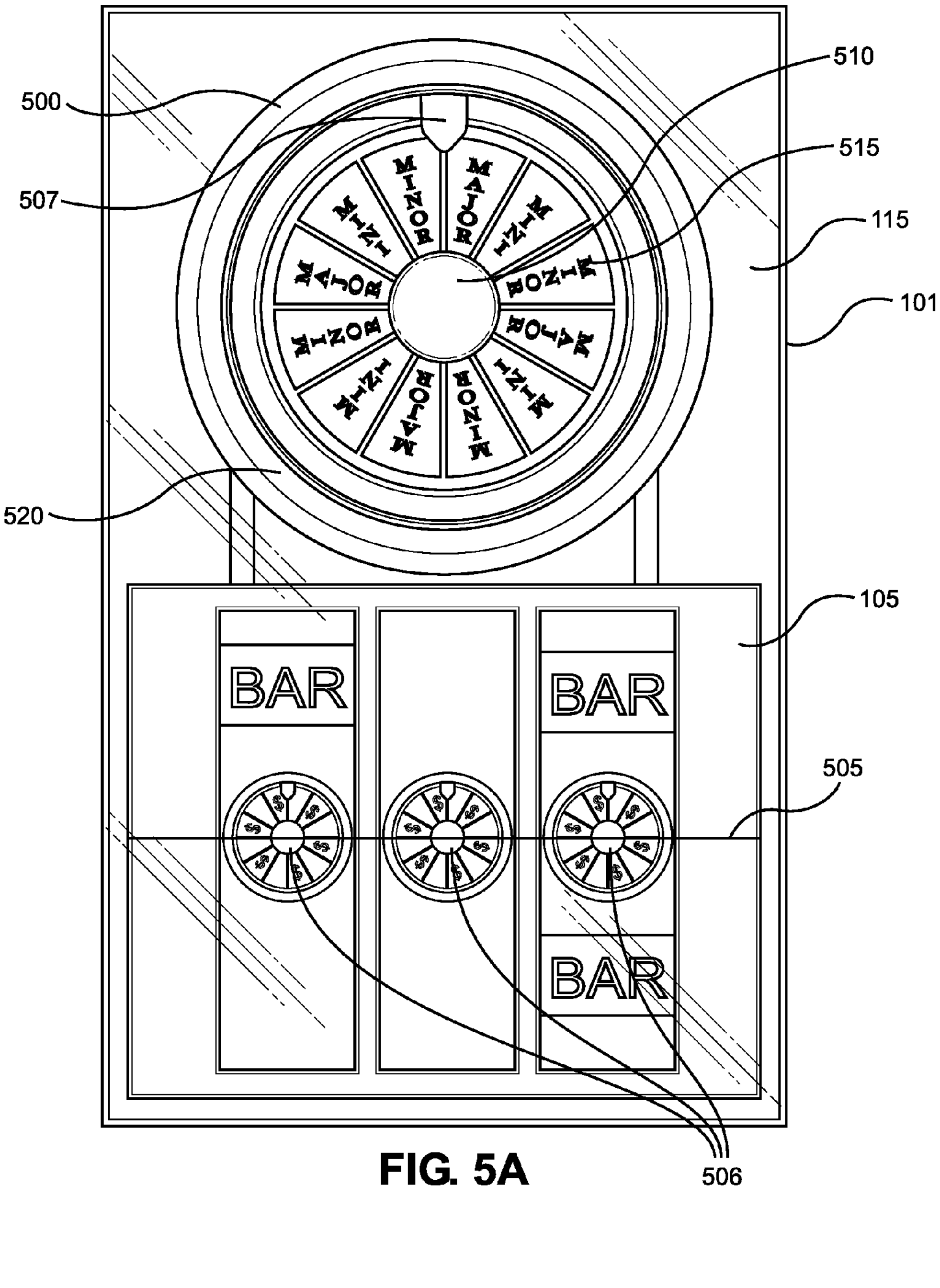
FIGS. 5A-B shows game play screens on an electronic gaming machine with a base game and a bonus game.

FIG. 5A shows a screen shot of displays 105 and 115 of EGM 101 during play of a base game. In this embodiment, display 115 is a flat screen LCD that has been fitted with a bezel 500 having a round, wheel-shaped opening so that a video wheel may be displayed for viewing. Bezel 500 may include one or more additional openings 520 around the periphery of the round, wheel shaped opening to provide visual effects on display 115.

In FIG. 5A, display screen 105 shows symbols 406 representing the outcome of a game on EGM 101. Once play has ended, it is determined whether the player has won or lost. In the representative display shown in FIG. 5A, the player has won by lining up 3 wheel symbols 506 on pay line 505. In that case, the base game ends and the player is eligible for a bonus game in the form of a spin of wheel 510. In an embodiment in accordance with the invention, bonus wheel includes dynamic wheel segments 515 which may change from spin to spin. In the example shown in FIG. 5A, wheel 510 includes 12 segments with four segments showing "MAJOR," four segments showing "MINOR," and four segments showing "MINI," where each of the three segment symbols (MAJOR, MINOR AND MINI) represent a separate progressive jackpot that corresponds in size to its name with MAJOR being a large jackpot, MINOR being a jackpot that is smaller than the MAJOR jackpot, and MINI being a relatively small jackpot compared to MAJOR and MINOR.

Figure 5B:
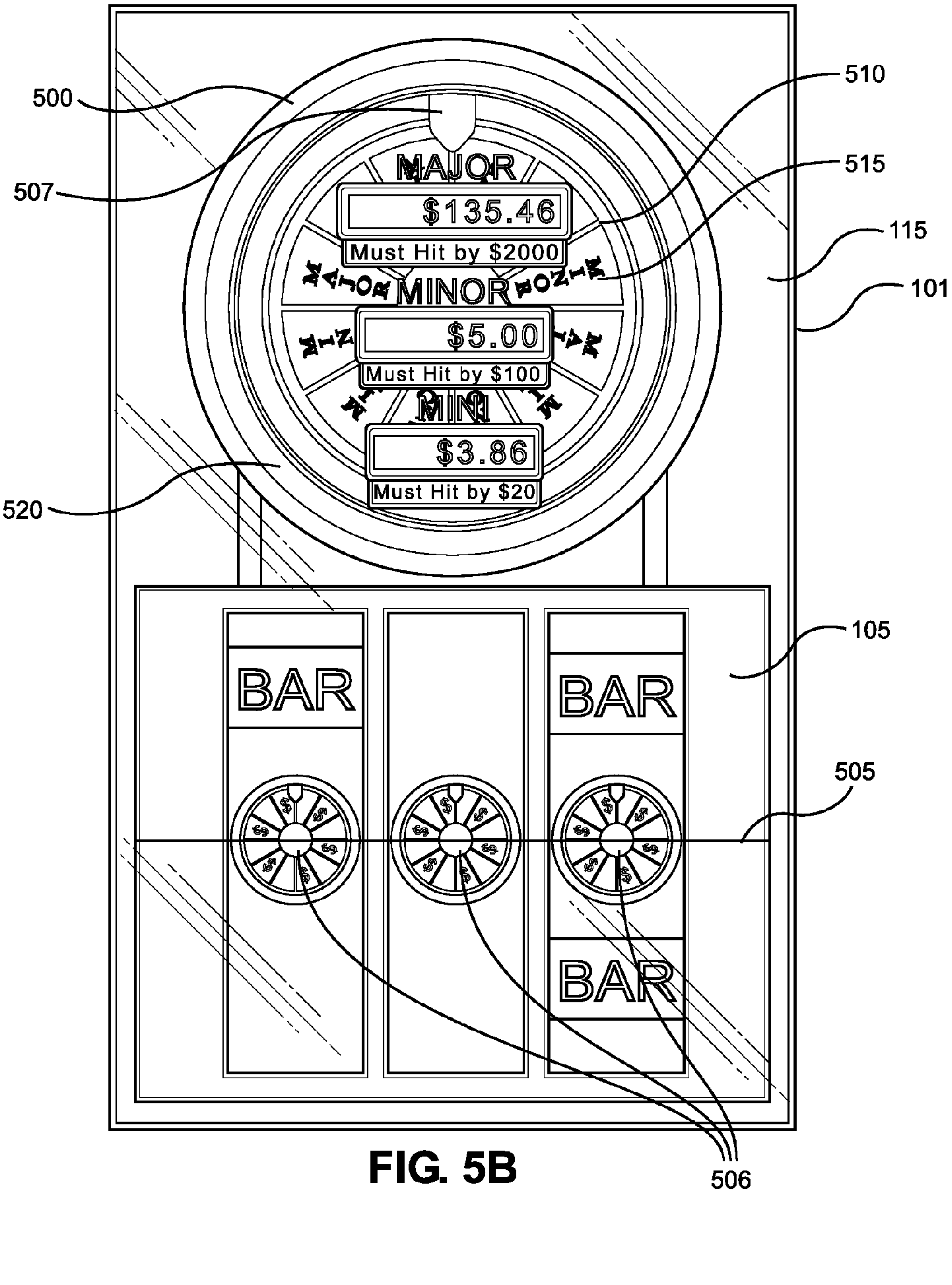

Once wheel 507 begins to spin, the value of each of the progressive jackpots is shown with the incrementing value for each of the jackpots that the player is playing for. An example of this display is shown in FIG. 5B where MAJOR is $135.46, MINOR is $5.00 and MINI is $3.86 and each of these amounts continues to increment as the wheel spins. The jackpots and their respective values are shown as an overlay and are transparent so that the player can see wheel 510 continuing to spin behind the jackpots. As wheel 510 slows and comes to a stop, the jackpot meters fade and disappear revealing wheel 510 again and the winning segment in full view as it comes to a stop at winning indicator 507. Different visual and sound effects may be used to further enhance the excitement for the player. For example, progressive meters 515 may flash on and off as wheel 510 spins and any flashing of meters 515 may include different color schemes and patterns.

Additional openings 520 in bezel 500 may cause light patterns and different colors to flash or move around the periphery of wheel 510. A flashing of progressive meters 515, different colors and sounds over wheel 510 may also be used as a signal that one or more of meters 515 is approaching its maximum limit and the probability of hitting that progressive jackpot is increasing.

In addition to wheel 510 and openings 520 displaying different effects during the play of the base game and bonus game to increase the excitement level for players, wheel 510 and openings 520 may also display different effects during attract mode when EGM 101 is not being played, but is set up to display different light patterns and sounds to attract players to it. In one embodiment of the invention, wheel 510 is set to move in a slow spin mode rather than sitting idle waiting for a new player. The slow spin mode is likely to work more effectively to attractant to players than having an idle wheel when EGM 101 is not in play. A slow spin can be seen from a distance by players seeking out an EGM to play.

Another aspect of the present invention is the manner in which wheel 510 spins. Once the base game ends and the player is notified that he is eligible for the bonus game, he is given the opportunity to push the bonus button. As the bonus game starts, wheel 510 may begin to spin slowly at first, and then accelerate to full speed. As the bonus game comes to an end, bonus wheel 510 decelerates as it comes to a stop with the winning segment coming to rest under indicator 507. In attract mode where EGM 101 is not in use, it is common for EGM 101 to perform different functions to catch a potential player's attention as he walks past. It is not uncommon for lights to flash, audio to be played, or images to flash on display 105. However, a new attract mode feature is to cause wheel 510 to continuously spin slowly until a player sits down to play. In addition, an overlay of the progressive jackpots showing the respective values incrementing can be shown either at predefined intervals or at times when they are closing in on a maximum value where there is an increasing probability that there will be a winner.

With respect to the progressive jackpots, it is also possible to configure the jackpots so that a winner is selected no later than a predefined upper limit for the prize. For example, in the case of the jackpots shown in FIG. 5B, the MINI jackpot may have a starting value of $2.00 and a maximum value of $5.00 before it is won. Similarly, the MINOR jackpot may have a starting value of $5.00 and a maximum value of $25.00. And, the MAJOR jackpot may have a starting value of $100.00 and a maximum value of $1,000.00. For all three jackpots, the game designer may increase the probability of winning the jackpot as the jackpot grows with a 100% likelihood of hitting the jackpot when it reaches the maximum value. In that case, the player that times play to the incrementing jackpot as it hits its maximum will win. Displaying the jackpots during an attract mode, with different highlight features to indicate that the jackpot is close to the maximum is a highly effective attractant to potential players.

Bonus display 115 may be implemented as a touchscreen display. The touchscreen functionality may be used for a number of different operations including selecting certain segments 515 to be dynamically changed or eliminated from play. For example, a player may be awarded opportunities during play of the base game or the bonus game to eliminate one or more segments 515 from the bonus game. If the player is awarded an opportunity, such as for example by lining up one or more symbols on a payline in the base game, or hitting a particular segment in the bonus game on successive plays, in that case, as wheel 510 is spinning, the player would be instructed to touch one of segments 515 during the next play of the bonus game. Doing so would eliminate the touched segment from wheel 510 thereby increasing the probability of hitting the remaining segments. In the case of the three progressive jackpots shown (MAJOR, MINOR, MINI) with four segments labeled for each of the three jackpots, eliminating one of the MINI segments would increase a player's chance to get a MAJOR or MINOR jackpot for that particular play of the bonus game and reduce the probability of hitting a MINI segment. Alternatively, touching a segment may cause that segment to change to a different award. For example, a player touching a MINI segment, may succeed in changing that MINI segment to a MAJOR segment thereby increasing the probability of hitting a MAJOR segment. In yet another embodiment, touching a segment may cause it to change to a fixed value award such as $500.00 or any other amount.

Figure 6:
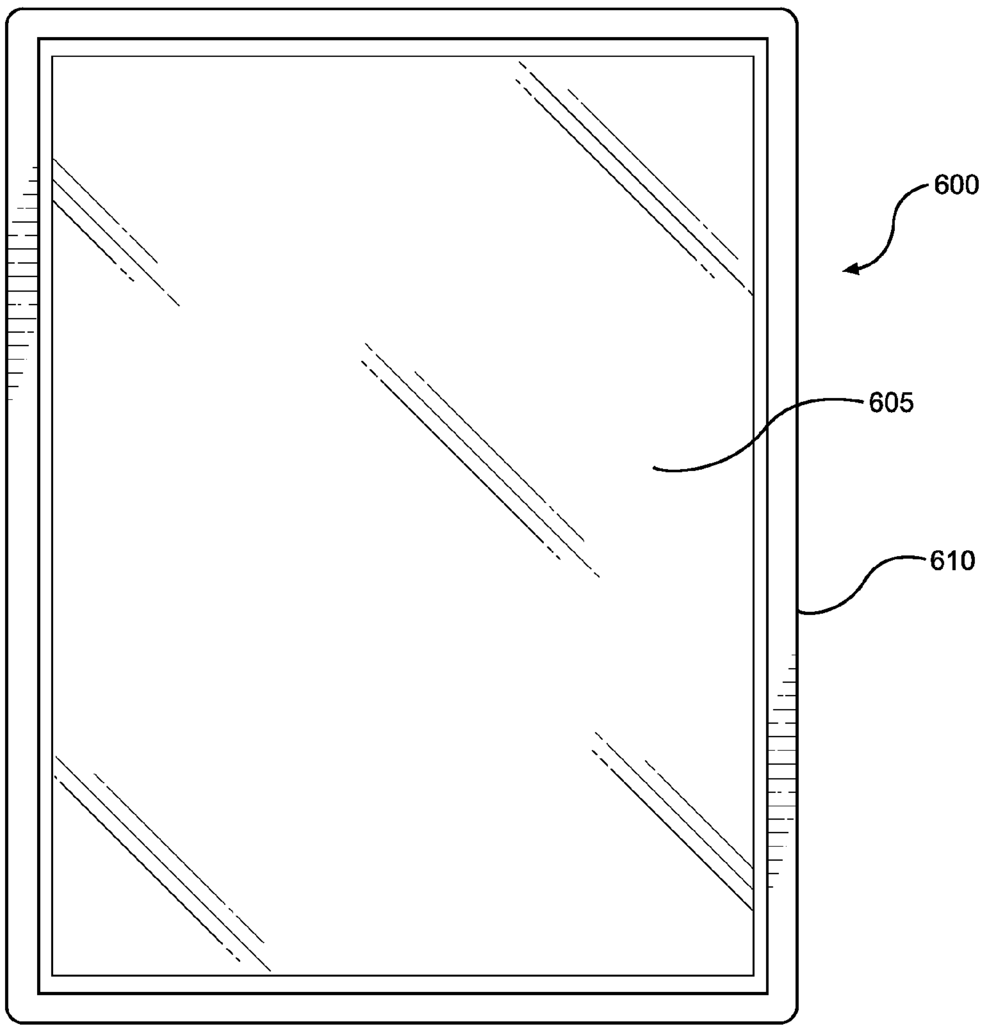
FIG. 6 shows a rectangular shaped flat screen display.
Figure 7A:
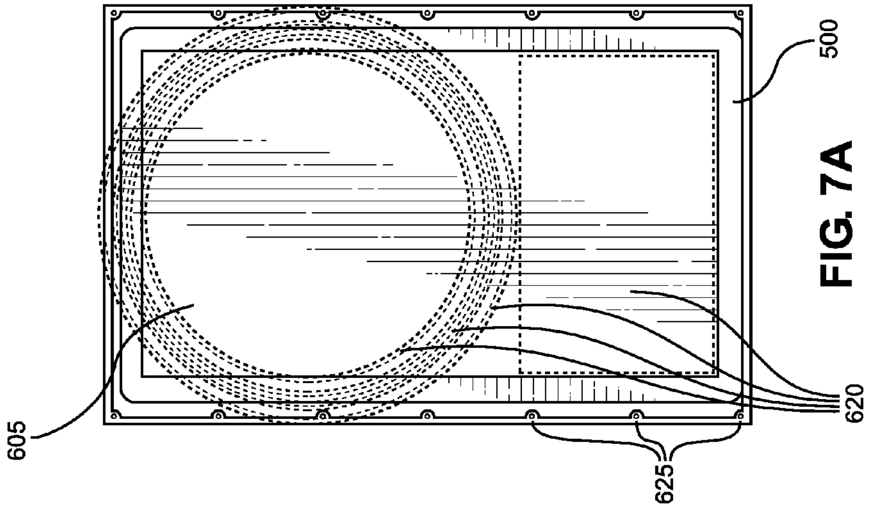
FIGS. 7A-C show a bezel with openings that is fitted over a rectangular flat screen to enhance bonus game images.
Figure 7B:
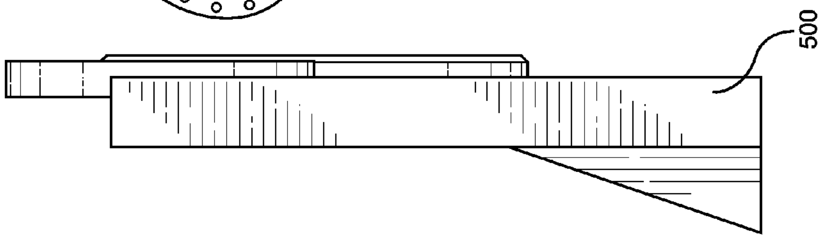
Figure 7C:
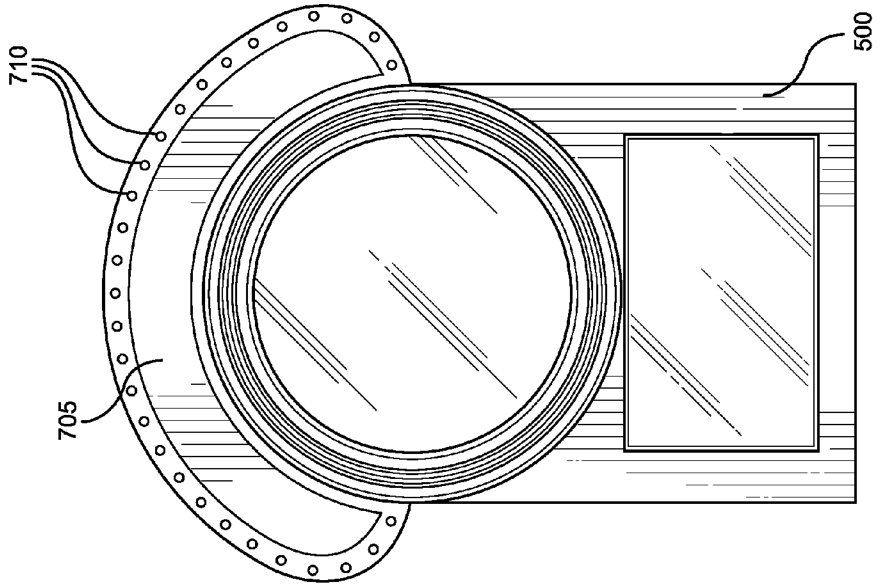

FIG. 6 shows a standard flat screen display 600 of the type used to display wheel 510 and other bonus game images. Flat screen 600 may be a standard LCD screen, including LED or other technologies to improve the quality and/or resolution of the images presented. Flat screen 600 has a screen 605 and a frame 610. FIGS. 7A-C show a bezel 500 with a circular opening 605 to display wheel 510 and other openings 620 which may be of any shape or size. FIG. 7A is a front drawing view, FIG. 7B is a side view and FIG. 7C is a front view with an ornamental component. In the case of FIGS. 7A-C, openings 620 include a rectangular shaped opening and a grouping of nested circular openings around the outside of circular opening 605. The nested openings may be formed of a separate component that is mounted to the front of bezel 500. Bezel 500 is typically made of plastic, but may also be made of metal or another rigid material that is light, durable and long-lasting. Bezel 500 is mounted to the front of display 600 using screws or bolts 625 that pass through bezel 500 and attach to frame 610 of display 600. Other elements of bezel 500 may include ornamental sections such as section 705 with lights 710 that may also be used to accompany different game play elements.

Figure 8:
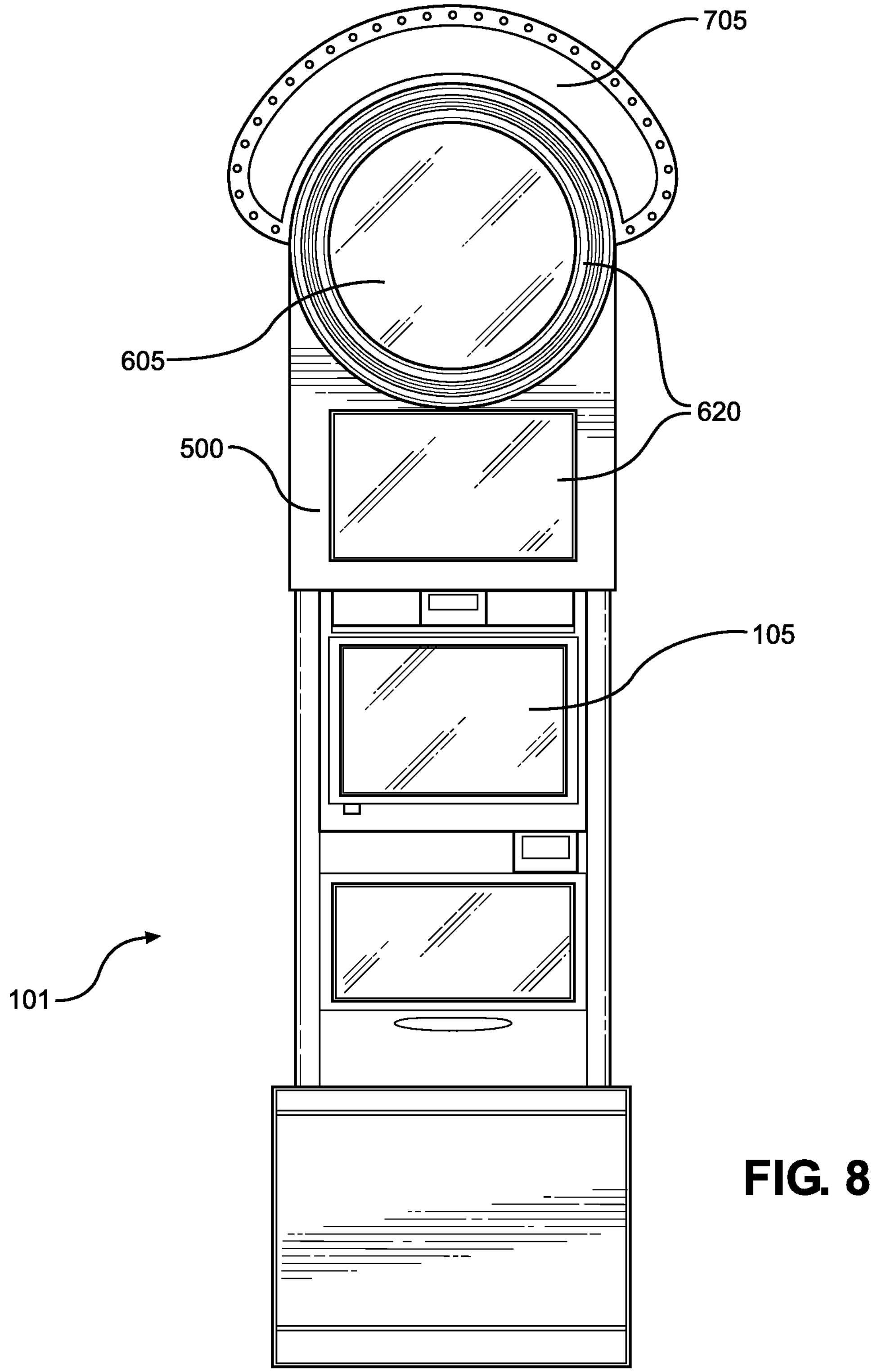
FIG. 8 shows an electronic gaming machine with a rectangular shaped flat screen display with openings and having a bezel fitted over the flat screen to enhance bonus game images.

FIG. 8 shows electronic gaming machine 101 with a rectangular shaped flat screen display with bezel 500 having openings 605, 620, and fitted over the flat screen display to enhance bonus game images.

While the invention has been described with respect to the figures, it will be appreciated that many modifications and changes may be made by those skilled in the art without departing from the spirit of the invention. For example, the bonus game may be a networked shared wheel indicator as shown in FIG. 3A which may be substituted for the individual video wheel 510 shown in FIGS. 5A-B. In addition, instead of using a standard flat display screen, a transparent LCD may be used to show a video image of a set of jackpots over either of: 1) a second standard (non-transparent) LCD behind the transparent LCD; or 2) a physical wheel, a set of physical reels or one or more other physical indicator devices. Any variation and derivation from the above description and drawings are included in the scope of the present invention as defined by the claims.

What is claimed is:

1. An electronic gaming machine ("EGM") on which a player plays a game with game operations displayed on a wheel with a plurality of award segments, comprising:

an accepting device configured to receive a wager in the form of a physical item associated with a monetary value, the monetary value establishing a credit balance on the EGM, wherein the credit balance is increasable and decreasable based at least on wagering activity;

a random number generator for generating random numbers that determine the outcome of the game and that correspond to a predefined set of game outcomes including winning and losing outcomes;

a first display for displaying game play screens including game outcomes to a player;

a controller for controlling game play on the EGM that determines whether the player is eligible for game operations displayed on the wheel; and a second display with a shaped bezel for showing the game operations in the form of the wheel having multiple segments, wherein each segment has a dynamically defined award for a particular game that is determined and changeable during a cycle of play in response to player input on the EGM that changes an underlying paytable and probability distribution for the game outcomes, and further wherein the second display shows the dynamically defined value of at least one segment as a video overlay on top of the wheel during a time period that the wheel is spinning.

2. The EGM of claim 1 further comprising one or more openings in the bezel for displaying game effects during game play.

3. The second display of claim 1 wherein the wheel moves at a constant speed that is slower than during the game than while the EGM is in an attract mode.

4. The EGM of claim 1 wherein the second display is located outside of the EGM and is shared with other EGMs on a network.

5. The EGM of claim 2 wherein the game effects are in the form of light patterns that are depicted on one or more of the first display, the second display and in the bezel openings.

6. The EGM of claim 1 further comprising a network of gaming machines wherein game prizes are aggregated from and determined based upon play on a plurality of EGMs connected to the network.

7. The EGM of claim 2 further comprising a network of gaming machines wherein game prizes are aggregated from and determined based upon play on a plurality of EGMs connected to the network.

8. The EGM of claim 7 wherein the game effects are in the form of light patterns that are depicted on one or more of the first display, the second display and in the bezel openings.

9. The EGM of claim 1 further comprising a network and a server which are configured to allow communications between the EGM and the server for the exchange of game content, payment data and other information to permit EGM to operate on the network.

10. A method of playing a game on an electronic gaming machine ("EGM") having a controller that executes a random number generator program implemented in software, a first display and a second display with a bezel for showing game operations on a wheel with a plurality of award segments, comprising:

receiving a wager from the player at an accepting device configured to accept a physical item associated with a monetary value, the monetary value establishing a credit balance wherein the credit balance is increasable and decreasable based at least on wagering activity;

selecting a game random number by the controller that is converted to a game outcome wherein the game outcome is one of a plurality of outcomes in a predefined set of winning outcomes and losing outcomes and including bonus outcomes that entitle a player to play a bonus game;

determining whether the game outcome is a bonus outcome; displaying the game outcome on the first display;

offering a bonus game on a second display when the game outcome is determined to be a bonus outcome;

selecting a bonus game random number that is converted to a bonus game outcome for the bonus game wherein the bonus game outcome is one of a plurality of outcomes in a predefined set;

displaying a bonus game outcome on the second display in the form of a wheel having multiple segments, wherein each segment is a dynamically defined award for a particular game that is determined and changeable during a cycle of play in response to player input on the EGM that changes an underlying paytable and probability distribution for the game outcome, and further wherein the bonus game shows the dynamically defined value of at least one segment as a video overlay on top of the wheel during a time period that the wheel is spinning; and awarding a prize in accordance with the bonus game outcome.

11. The method of claim 10 further comprising displaying game effects during game play in one or more openings in the bezel.

12. The method of claim 10 wherein the wheel moves at a constant speed that is slower than during the game than while the EGM is in an attract mode.

13. The method of claim 10 further wherein the second display is located outside of the EGM and is shared with other EGMs on a network.

14. The method of claim 11 wherein the game effects are in the form of light patterns that are depicted on one or more of the first display, the second display and in the bezel openings.

15. The method of claim 10 wherein game awards are aggregated from and determined based upon play on a plurality of EGMs connected to a network.

16. The method of claim 11 further comprising a network of gaming machines wherein bonus game awards are aggregated from and determined based upon play on a plurality of EGMs connected to the network.

17. The method of claim 16 wherein the game effects are in the form of light patterns that are depicted on one or more of the first display, the second display and in the bezel openings.

18. The method of claim 10 further comprising providing a network and a server which are configured to allow communications between the EGM and the server for the exchange of game content, payment data and other information to permit EGM to operate on the network.

* * * * *